Sept. 4, 1951          O. J. WOLFE          2,566,393
CANTILEVERED TRAILER WHEEL SUSPENSION
Filed Dec. 22, 1947          3 Sheets-Sheet 1
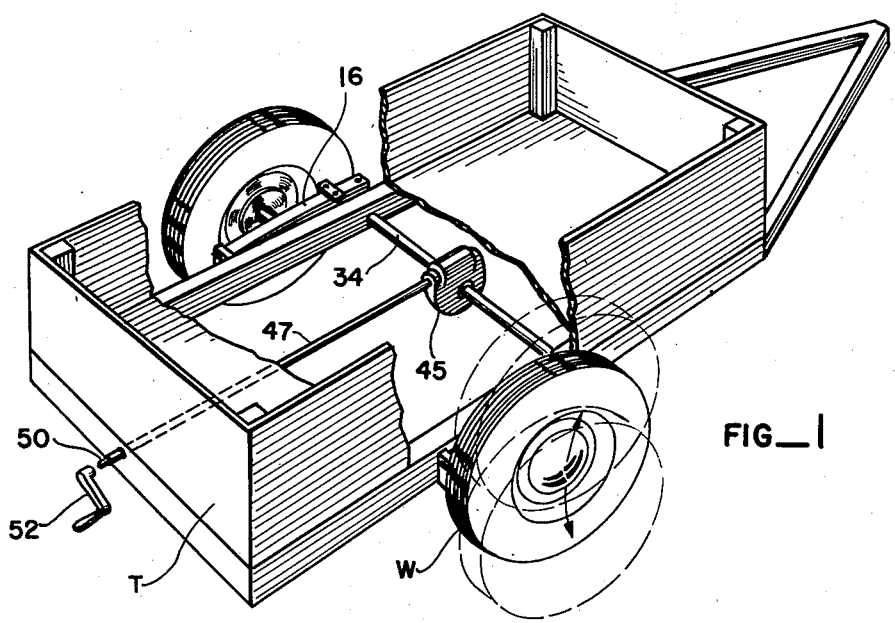
FIG_1
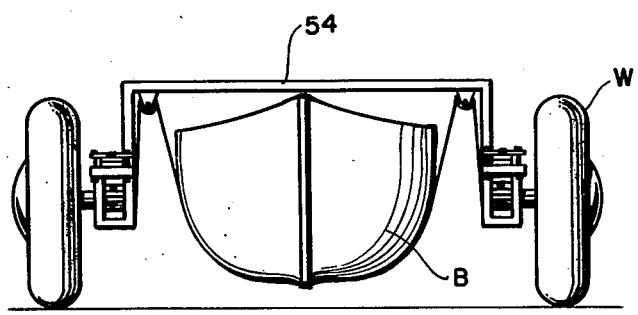
FIG_2
ORRIN J. WOLFE
Inventor
By *Smith & Tuck*
Attorneys Sept. 4, 1951          O. J. WOLFE          2,566,393
CANTILEVERED TRAILER WHEEL SUSPENSION
Filed Dec. 22, 1947          3 Sheets-Sheet 2
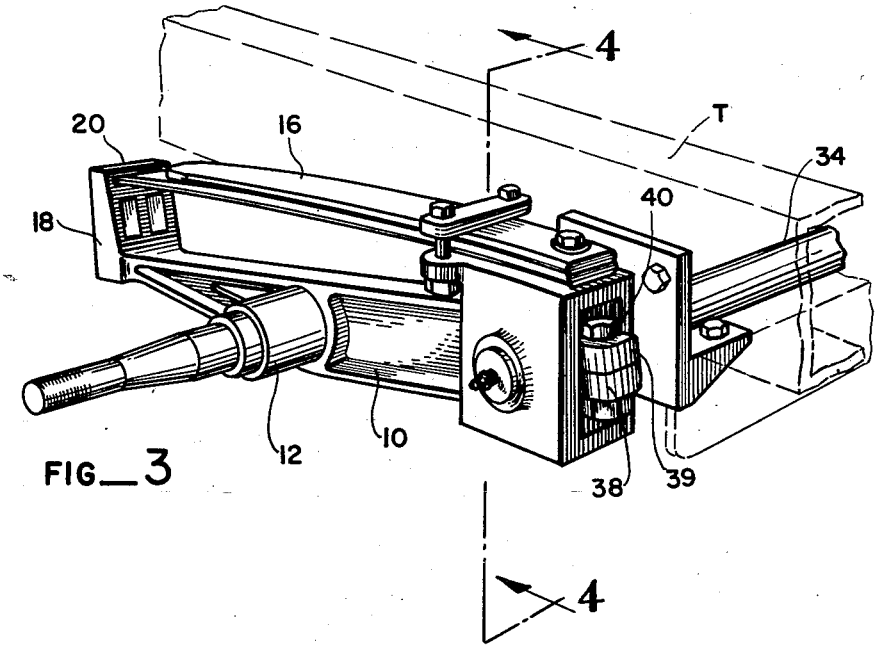
FIG_3
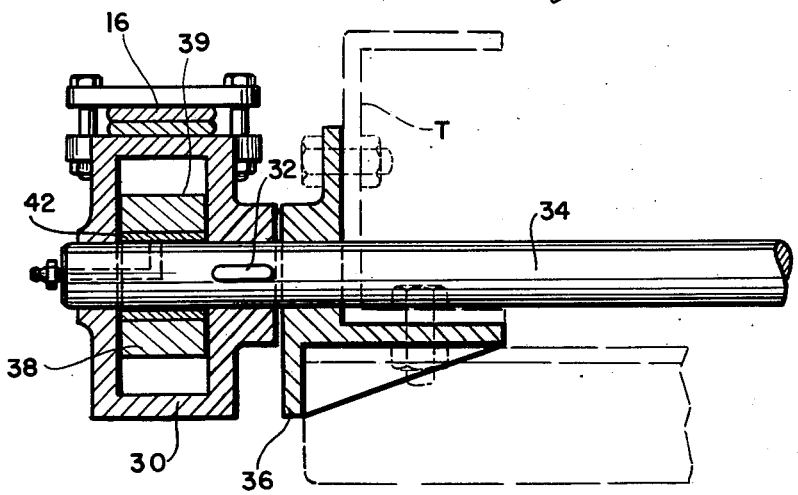
FIG_4
ORRIN J. WOLFE
Inventor
By Smith & Tuck
Attorneys

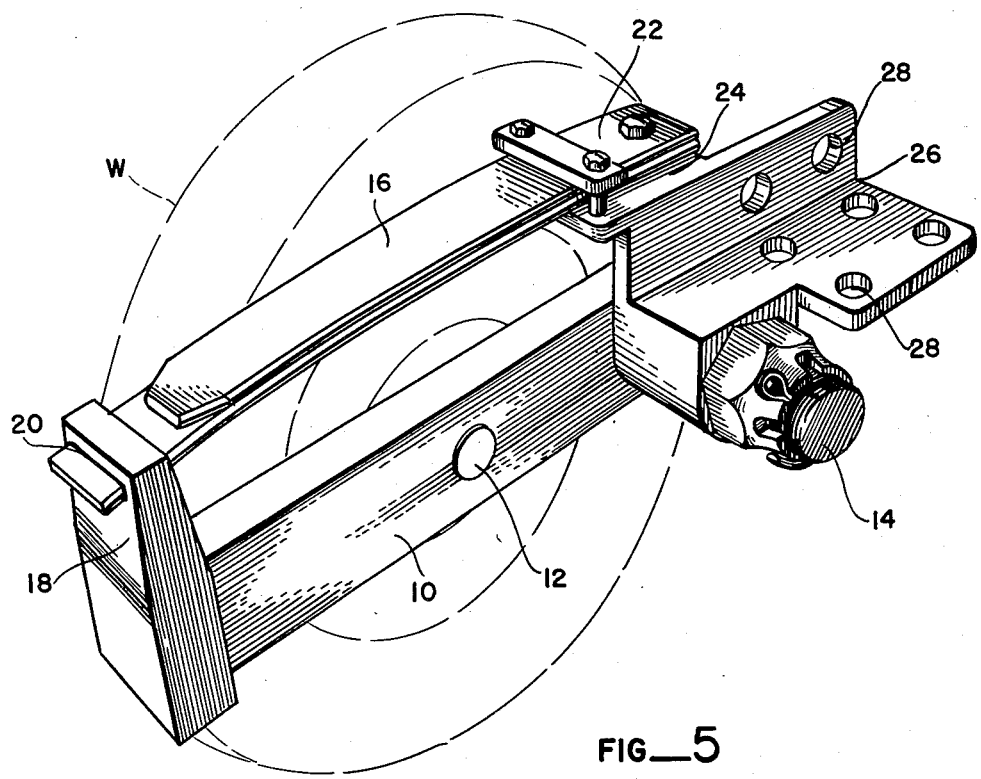
FIG_5
ORRIN J. WOLFE
Inventor

Patented Sept. 4, 1951

2,566,393

UNITED STATES PATENT OFFICE 2,566,393

CANTILEVERED TRAILER WHEEL SUSPENSION

Orrin J. Wolfe, Bellingham, Wash.

Application December 22, 1947, Serial No. 793,075

2 Claims. (Cl. 267—19)

My present invention relates to the general art of automobile trailers and, more particularly, to a cantilevered trailer wheel suspension.

The increasing general use of automobile trailers has encouraged the perfection of trailers in a wide variety, adapted usually for a specific use. Many of these trailers are admirably adapted for some one particular use and are of little value for other uses. It is therefore one of the purposes of my present invention to provide a trailer which will lend itself to general utility, so that a person may get continuous use from his trailer rather than have one that is used at rare intervals and then must be packed or housed between periods of use at considerable inconvenience.

Trailers now available in the market may be generally classed in two types. The first class comprises those which, because of simplicity of manufacture, do not involve any spring suspension at all, and rely upon the deflection of the tires solely for cushioning effect. Such trailers have definite limitations as to the type of roads they can be used on, and the load that can be carried in them without serious damage to those roads or to the tires which are unduly stressed. In the second class of trailers are those involving springs of the type usually employed in automobile construction. Such springs, while providing an excellent vehicle, add greatly to the cost and complication of the trailer.

It is therefore a first purpose of my invention to provide a mount for the trailer wheels which can be used in a number of ways and which may be properly classified as being in between the two types of trailers just described. In such a construction, I provide relatively strong, but short, springs arranged so that the wheel mount, together with the springs, forms a commercial unit which may be adaptable for home construction of trailers, or permits the use of this expensive portion of a trailer in a variety of different ways, some of which it is practical for the owner to interchange for specific purposes. I have found, for instance, that it is possible to mount my spring-bracket and wheel-spindle assembly directly onto the frame-work of a trailer for an inexpensive arrangement where a maximum amount of road clearance is desired. I can further mount my assemblies on the low beds of animal trailers, or the same may be mounted to carry boats; for instance, either to straddle the boat, or by means of an arrangement adapted to revolve a cross-member, both wheels may be lowered together, or the same general mechanism may be employed so that either wheel may be lowered separately.

The principal object of my invention, therefore, is to provide a cantilevered wheel and spring mount which can be manufactured economically, and which will have a wide range of adaptations.

A further object of my invention is to provide a spring and wheel spindle assembly which will give spring resilience to the trailed load without the complicated structure of an automobile spring suspension arrangement and which will save the trailer tires undue abuse.

A further object of my invention is to provide a spring and wheel spindle combination which can be adapted for low bed trailers of various types.

A further object of my invention is to provide a means for attaching a spring backed wheel spindle which may be used on house trailers, and the like, or may be used on overhead suspension boat trailers.

A further object of my invention is to provide means whereby the entire spring and spindle assembly can be pivoted about its supported axle so that the entire depth of the trailer can be adjustably positioned for height or transverse inclination.

Further objects, advantages and capabilities will be apparent from the description and disclosure in the drawings, or may be comprehended or are inherent in the device.

In the drawings:

Fig. 1 is a perspective view showing the fullest utilization of my present invention, certain parts of the drawing being broken away in order to add to the clarity of the illustration.

Fig. 2 is a front elevation of an overhead suspension type of boat trailer showing the adaptability in the use of my wheel-supporting means, certain parts being omitted for clarity of illustration.

Fig. 3 is a perspective view showing the arrangement of parts employed in my spring and wheel spindle assembly.

Fig. 4 is a cross-sectional view in elevation taken along the line 4—4 of Fig. 3.

Fig. 5 is a perspective view showing a simplified form of my trailer wheel and spring assembly.

Referring more particularly to the disclosure in the drawings, the numeral 10 designates the main suspension arm of my device. This is provided, at substantially its mid-point, with a wheel spindle 12. This spindle is preferably designed to accept the anti-friction bearing equipped hub of the size wheel of the car that will normally tow the trailer. Owing to the requirement for special treatment and special alloy steels for the production of this spindle, I prefer it to be a separate unit which is fixedly secured, by convenient means, to bar 10. This may be achieved by threading it into the bar, or by passing it through a bored opening and then welding the same in place.

At one of its ends, bar 10 is adapted to be supported by a pivot member 14. This arrangement should provide a true pivot action, so that bar 10 is free to move about pivot 14, except as it is restrained by spring 16. At the opposite end from the pivot, I provide bar 10 with a raised portion 18, having the slot provided at 20 of such a size as to engage the end of spring 16.

Spring 16 should be made up in the manner well known in the construction of cantilever springs, in that one end, as 22, is fixedly supported and then a plurality of leaves extend out from this fixed point, with one or more of the bottom leaves passing through slot 20, which acts in the nature of a shackle, holding bar 10 in engagement with the spring against up or down deflection.

In Fig. 5, which is the simplest form of my device, I show spring 16 secured at 22 to a pad 24, which is in turn an extension of bracket 26. Bracket 26 is provided with a plurality of bolts or rivet holes 28 so that it may be fixedly secured to the longitudinal frame members of a trailer.

Bracket 26, in addition to forming a fixed support for the end of spring 16, also provides the journal for pivot 14, so that the entire assembly in its simpler form is a compact unit having wide application to trailers of many different styles, and making it possible for an individual to buy the component parts and build his own trailer, or it permits a small manufacturer to build trailers to custom specifications to the varying service conditions.

In the preferred form of my invention, I provide a structure that makes it possible to build, for instance, a trailer of the type illustrated in Fig. 1, wherein two of my wheel spindle and spring members are disposed, one at either side of trailer T, but instead of bracket 26 being fixedly secured to the longitudinal frame of the trailer, I provide that the modified bracket 30 be fixedly secured to a transverse shaft, as distinct from an axle, as by being keyed thereto by the key shown at 32, so that bracket 30 will at all times turn with shaft 34. In this instance, a modified frame bracket 36 is employed that provides a journal for shaft 34, one of these being used at each side of the trailer, complementary to the spring and spindle assemblies. In this form, I find it convenient to bifurcate the end of member 10, forming the two portions 38 and 39, and to then join them as by bolt 40, so that they may be clamped to a bushing 42. This holds the bushing as a fixture with arm 10 and an oscillating bearing is thus formed on shaft 34.

Referring to Fig. 1, it will be noted that I have provided a worm and worm-gear assembly at 45, the worm gear being fixed to cross shaft 34 and also secured to the crank shaft 47. This crank is led out either to the front, or preferably the rear of the trailer through a suitable bearing and provided with either a splined or slot-surfaced end 50 to which a detachable crank handle 52 can be attached. With this arrangement, by turning crank 52, an operator may raise or lower the bed of trailer T by means of revolving shaft 34, and in turn revolving spindle 12 and the wheels W carried thereby. This makes for very convenient loading of the trailer and makes it possible to change the road clearance at any time. It is generally recognized that a loaded trailer will travel best with its load concentrated close to the ground. This is practical, of course, only on paved roads and when such are encountered, the trailer bed can be lowered. Then if rougher roads are encountered, by adjustment through crank 52, any reasonable amount of clearance can be given underneath, thus adapting it for use in a wide variety of positions.

It is believed that it will be clearly apparent from the above description and the disclosure in the drawings that the invention comprehends a novel construction of a cantilevered trailer wheel suspension.

Having thus disclosed the invention, I claim:

1. A cantilevered trailer wheel suspension, consisting of: a suspension arm having a wheel spindle secured at right angles thereto and intermediate its ends; a multi-leaf spring disposed above and in the longitudinal plane of said suspension arm; an upward extension of said arm, at one end thereof, having a slot adapted to slidably engage the free end of said spring; a bracket disposed at the opposite end of said spring having a spring seat to which said spring is fixedly secured; a pivot shaft passing through said bracket and adapted to form a pivot about which said suspension arm may oscillate; and means for securing said bracket against rotation.

2. A cantilevered trailer wheel suspension, consisting of: a suspension arm having a wheel spindle secured at right angles thereto and intermediate its ends; a leaf spring disposed above and in the longitudinal vertical plane of said suspension arm; an upward extension of said arm, at one end thereof, having a slot adapted to slidably engage the free end of said spring; a bracket disposed at the opposite end of said spring having a spring seat to which said spring is fixedly secured; a pivot shaft passing through said bracket and adapted to form a pivot about which said suspension arm may oscillate; clamp means for securing said suspension arm to said pivot shaft; and means for adjustably securing said bracket against rotation.

ORRIN J. WOLFE.

REFERENCES CITED

The following references are of record in the file of this patent:

UNITED STATES PATENTS

| Number | Name | Date |
|---|---|---|
| 1,880,703 | Bischoff et al. | Oct. 4, 1932 |
| 1,920,206 | Masury | Aug. 1, 1933 |
| 2,141,781 | Allen | Dec. 27, 1938 |
| 2,179,477 | Berendsen | Nov. 14, 1939 |
| 2,227,762 | Ronning | Jan. 7, 1941 |

FOREIGN PATENTS

| Number | Country | Date |
|---|---|---|
| 311,072 | Great Britain | May 9, 1929 |